J. A. KRAMER.
SPRING WHEEL.
APPLICATION FILED DEC. 15, 1911.
1,070,702.
Patented Aug. 19, 1913.
3 SHEETS—SHEET 1.
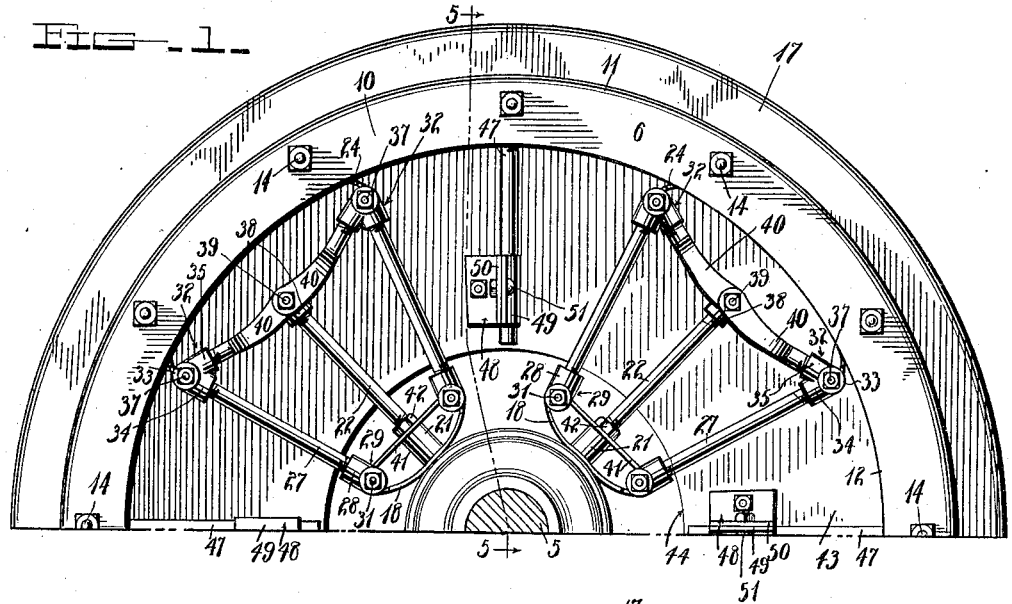
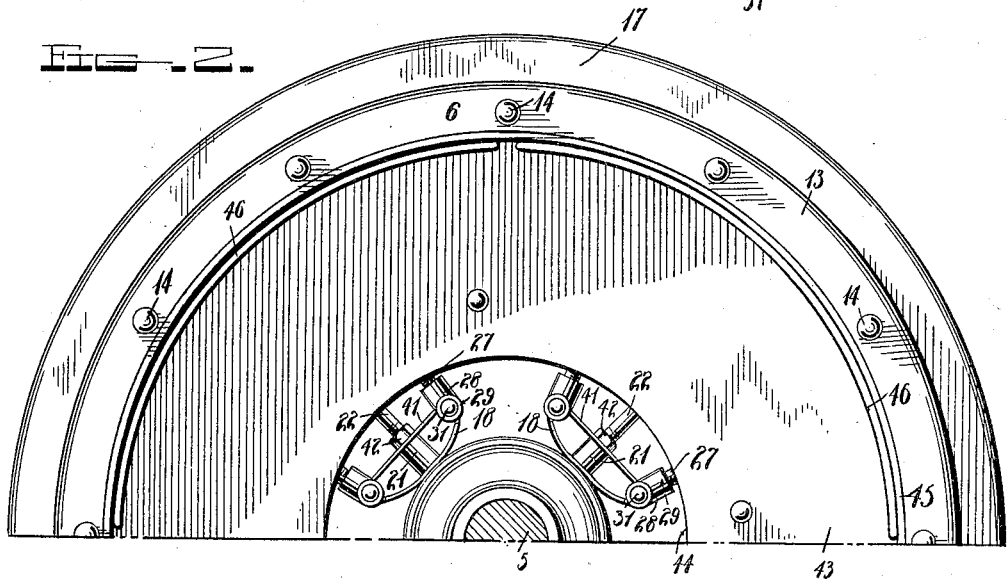
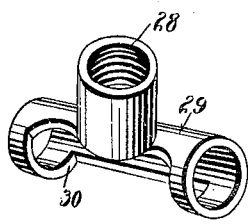
Witnesses
Inventor
J. A. Kramer.
By Harry Ellis Chandler
Attorney

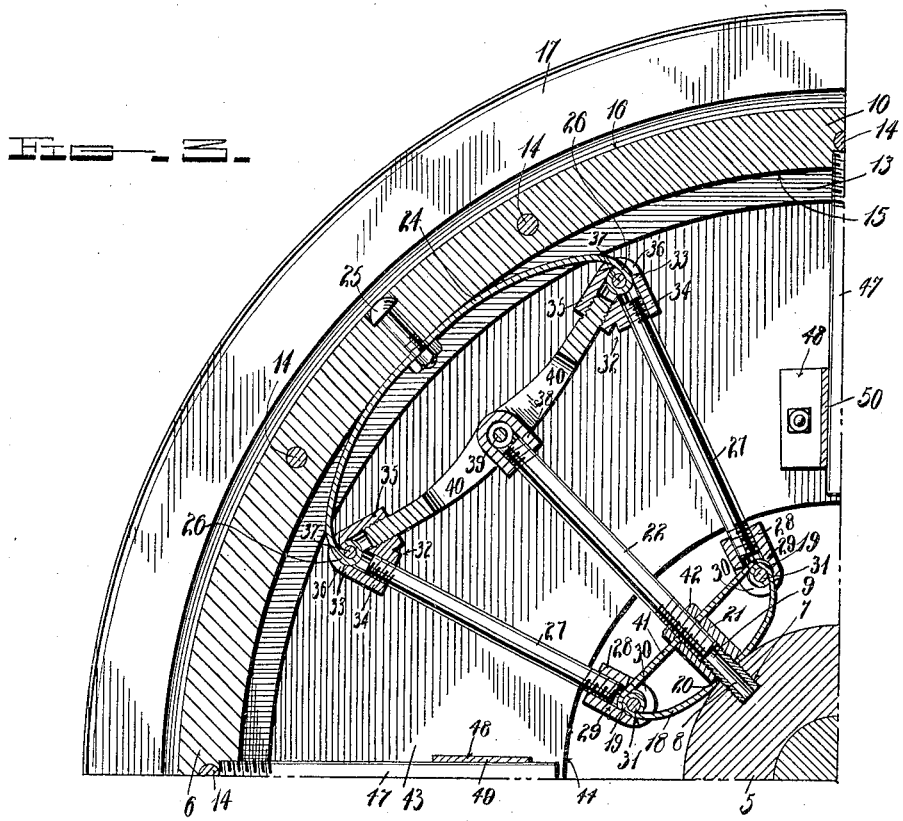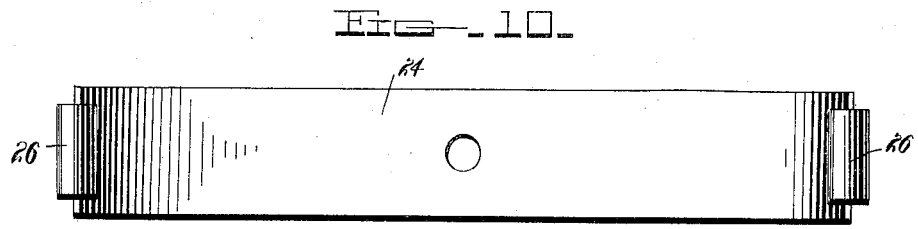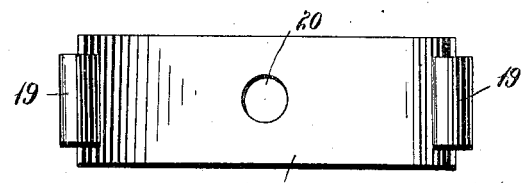

J. A. KRAMER.
SPRING WHEEL.
APPLICATION FILED DEC. 15, 1911.
1,070,702.  Patented Aug. 19, 1913.
3 SHEETS—SHEET 3.
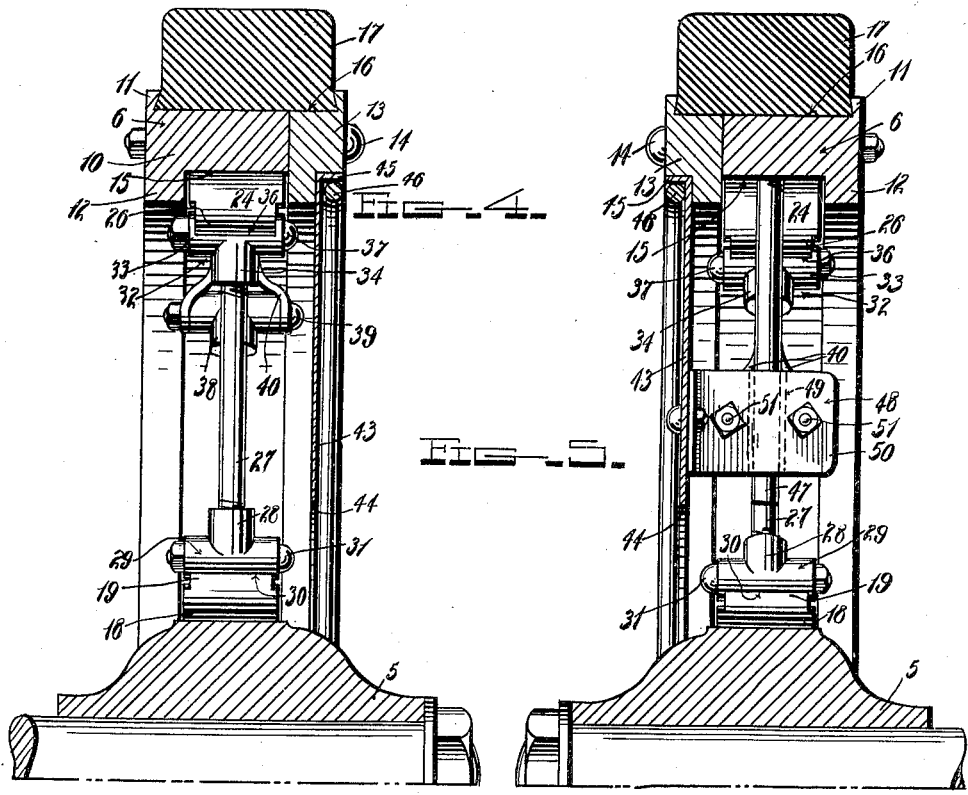
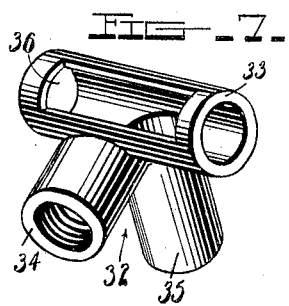
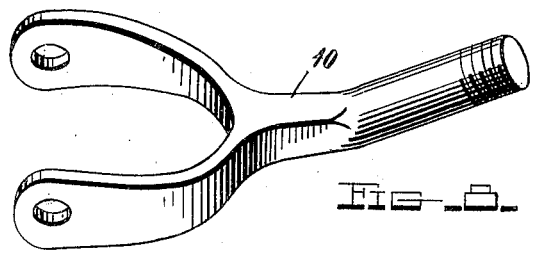
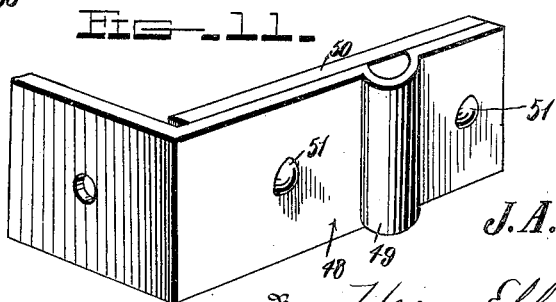
Witnesses
W. C. Fielding.
George Tate
Inventor
J. A. Kramer.
By Harry Ellis Chandler
Attorney

UNITED STATES PATENT OFFICE.

JOSEPH A. KRAMER, OF MINERAL POINT, WISCONSIN.

SPRING-WHEEL.

1,070,702.  Specification of Letters Patent.  Patented Aug. 19, 1913.

Application filed December 15, 1911. Serial No. 665,934.

*To all whom it may concern:*

Be it known that I, JOSEPH A. KRAMER, a citizen of the United States, residing at Mineral Point, in the county of Iowa and State of Wisconsin, have invented certain new and useful Improvements in Spring-Wheels, of which the following is a specification.

This invention relates to improvements in spring wheels.

The principal object of the invention is to provide a novel yielding means between the hub and rim, which means are so constructed as to readily absorb all shock incidental to the passage of the wheel over a rough surface.

Another object of the invention is to provide a spring wheel of the character described which is provided with a novel form of mud guard.

A further object of the invention is to provide a spring wheel which is composed of a comparatively few number of parts, is therefore simple in construction, is easy of assembling or disassembling, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings: Figure 1 is a plan view of the inner face of a wheel constructed in accordance with my invention, Fig. 2 is a plan view of the outer face of such a section, Fig. 3 is an enlarged detail longitudinal sectional view through the same, Fig. 4 is a cross sectional view through such a wheel, Fig. 5 is a detail sectional view taken on the line 5—5 of Fig. 1 looking in the direction indicated by the arrows, Fig. 6 is a perspective view of the coupling between one of the spring arms and the hub spring, Fig. 7 is a perspective view of the coupling between the upper end of the spring arm and the rim spring, Fig. 8 is a perspective view of one of the lateral arms connecting the spoke and spring arm, Fig. 9 is a plan view of the hub spring, Fig. 10 is a plan view of the rim spring, and Fig. 11 is a perspective view of the guard attaching bracket.

Like reference numerals designate corresponding parts in all the figures of the drawings.

Referring to the drawings, the invention comprises a hub 5 and a rim 6, the former being formed in its periphery with a plurality of spaced radial recesses 7, and in each of these recesses is located a stud 8, one end 9 thereof projecting exteriorly of the hub and being exteriorly threaded.

The rim 6 consists of a body portion 10 having outwardly and inwardly extending flanges 11 and 12 respectively projecting from the inner face thereof. A detachable flange 13 is secured to the outer face of the body portion by bolts 14 or other suitable fastening means, and the edges of this flange respectively project beyond the inner and outer faces of the body portion to form consequent inner and outer flanges corresponding to the inner and outer flanges 11 and 12 above mentioned. It will thus be observed that by means of this construction inner and outer circumferential grooves 15 and 16 are formed. A tire 17 of any suitable construction is seated within the outer circumferential groove 16. The side walls of the outer flanges are preferably undercut so as to form a dovetail groove adapted to tightly embrace the said tire.

My invention further comprises a plurality of hub springs 18 which are each formed of flat spring metal. Each spring is bowed, and has its ends inwardly turned to form transverse bearings 19. Furthermore, each spring is centrally formed with an opening 20 adapted to receive the outer end 9 of a respective stud 8. Interiorly threaded tubular couplings 21 are each engaged with the threaded end 9 of a respective stud 8 and bear against the hub spring 18 to hold the latter against the hub, the ends of the spring being outwardly curved. A spoke 22 which is preferably formed of piping has threaded engagement at its inner end with the coupling 21. The outer end of each spoke is exteriorly threaded and terminates in spaced relation to the rim 6.

Disposed within the inner groove 15 of the rim is a plurality of spaced rim springs 24. These springs are respectively disposed opposite the hub springs 18, and are likewise formed of spring metal. Each of these rim springs is centrally secured to the body of the rim by means of bolts 25 or other suitable fastening means. The springs are furthermore inwardly bowed, and each spring is of a length considerably greater than that of the corresponding hub spring. The ends of each rim spring are inwardly bent to form transverse bearings 26—26.

Associated with each spoke and arranged on either side thereof are spring arms 27—27. Each arm is preferably formed of piping, and has its lower end connected to the stem 28 of a transversely disposed T 29. The inner face of the head of said T is cut away longitudinally, as indicated by the reference numeral 30, to receive a respective transverse bearing 19 of the hub spring 18. A pivot bolt 31 is disposed within each head of the T and the bearing. A coupling element, designated as a whole by the reference numeral 32, is connected to the upper end of each spoke. Each of these elements includes a T consisting of a head 33, a stem 34 which is engageable with a respective spoke, and a lateral socket 35 which projects inwardly from the head. This coupling element is so associated with a spoke as to be disposed transversely of the wheel and in alinement with the inner groove 15 of the rim. The outer face of the head 33 is cut away, as indicated by the reference numeral 36, to receive the transverse bearing 26 of the rim spring 25. A pivot bolt 37 is disposed within the head and said bearing.

A T 38 has its stem connected to the outer end of the spoke 22, the head of said T being transversely disposed with respect to the wheel. A pivot bolt 39 is disposed within said head. Arms 40—40 are each connected at its outer end to a respective lateral socket 35 and has its inner end bifurcated to form a yoke, the arms of each yoke being pivotally connected to the pivot bolt 39.

An equalizing spring 41 of flat spring metal is centrally secured around the spoke 22 and bears against the coupling 21. A nut 42 is carried by the spoke 22 and bears against the said spring, and thereby not only locks the spring against movement but also acts as a nut lock to prevent the rotation of said spoke. The outer ends of this equalizing spring are respectively disposed within a cut out portion of the T's 29 and above the bearings 19 of the hub springs.

From the foregoing, it will be observed that any vibrations of the wheel incidental to the same passing over uneven ground will be absorbed by the hub springs and rim springs through the medium of the spring arm, and any extraordinary shock will act upon the equalizing spring and cause the latter to operate to hold the said hub and rim springs against flattening too quickly.

The outer face of the detachable flange 13 is rabbeted to receive the outer edge of a circular mud guard 43. This guard is formed of flat metal, and has its inner edge 44 disposed in spaced relation to and concentric with the hub 5. The outer edge of this guard is bent to form a laterally extending peripheral flange 45. A series of arcuate beads 46 are disposed against the outer face of the guard and against the flange, and each of these beads has its ends inwardly bent and secured within the rim. By means of these beads the outer end of the mud guard is held against accidental displacement. In order to secure the inner portion of the guard against transverse swinging movement with respect to the rim and consequently the spokes, there is provided a series of posts 47 which are each connected at its outer end to the inner face of the rim 6, and has its outer end disposed in spaced relation to the hub 5. An anglebracket 48 is secured to the inner face of the guard, and has its major portion extending laterally and transversely grooved, as indicated by the reference numeral 49, to receive a respective post 47. A keeper 50 is disposed against the bracket, and secured thereto by means of bolts 51 or other suitable fastening means.

What is claimed is:

1. A spring wheel comprising in combination, a hub, a rim, a series of alined pairs of flat springs respectively curved outwardly and inwardly and connected to the periphery of the hub and to the inner face of the rim, a series of spokes projecting from the hub springs and terminating at their outer ends in spaced relation to the rim, and a pair of radial arms respectively disposed on either side of each spoke and connected at their inner ends to the ends of the respective hub spring and at their outer ends to the ends of the respective rim spring, a second pair of arms and each arm having one end connected to the juncture of the radial arm and the rim spring and the other end pivotally connected to the outer extremity of the respective spoke.

2. A spring wheel comprising in combination, a hub, a rim, a series of alined pairs of flat springs respectively curved outwardly and inwardly and connected to the periphery of the hub and to the inner face of the rim, a series of spokes projecting from the hub springs and terminating at their outer ends in spaced relation to the rim, a pair of radial arms respectively disposed on either side of each spoke and connected at their inner ends to the ends of the respective hub spring and at their outer ends to the ends of the respective rim spring, and a plurality of pairs of arms respectively having one end of each arm rigidly connected to the outer end of a respective radial arm and the other end pivotally connected to the outer end of the respective spoke.

3. A spring wheel comprising in combination, a hub, a rim, a series of alined pairs of flat springs respectively curved outwardly and inwardly and connected to the periphery of the hub and to the inner face of the rim, a series of spokes projecting from the hub springs and terminating at their outer ends in spaced relation to the rim, a pair of radial arms respectively disposed on either side of each spoke and connected at their inner ends to the ends of the respective hub spring and at their outer ends to the respective rim spring, a plurality of T's each having its stem connected to the outer end of a spoke and having its head transversely disposed with respect to the rim, a pivot bolt disposed within said head, and a plurality of pairs of arms, the arm of each pair having its outer end rigidly connected to the outer end of a respective radial arm and the inner end pivotally connected to said pivot bolt.

4. A spring wheel comprising in combination, a hub, a rim, a series of alined pairs of flat springs respectively curved outwardly and inwardly and connected to the periphery of the hub and to the inner face of the rim, the ends of said springs being coiled to form bearings, a plurality of T's each having its head cut away to receive a respective bearing, a pivot bolt disposed in each head and bearing, a series of spokes projecting from the hub springs and terminating at their outer ends in spaced relation to the rim, a pair of radial arms respectively disposed on either side of each spoke, the arms of each pair being respectively connected at their ends to the stems of the T's of the hub and rim springs, and connections between the ends of each rim spring and the outer end of a respective spoke.

In testimony whereof I affix my signature, in the presence of two witnesses.

JOSEPH A. KRAMER.

Witnesses:
T. M. PRIESTLEY,
H. T. PRIESTLEY.

---

Copies of this patent may be obtained for five cents each, by addressing the "Commissioner of Patents, Washington, D. C."